March 10, 1953 J. M. WHEATON 2,630,944
DISPENSING PACKAGE FOR LIQUIDS
Filed April 12, 1950
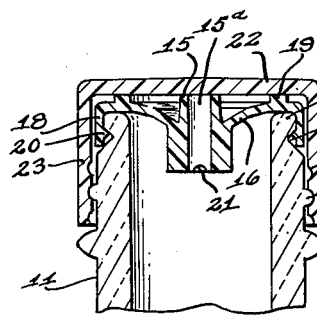
FIG-2-
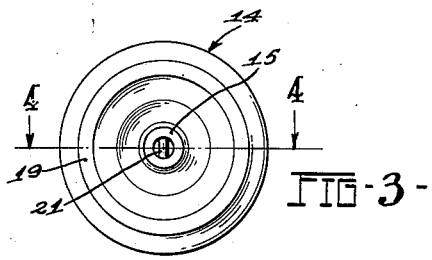
FIG-3-
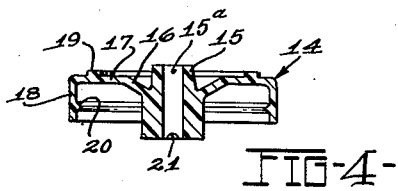
FIG-4-
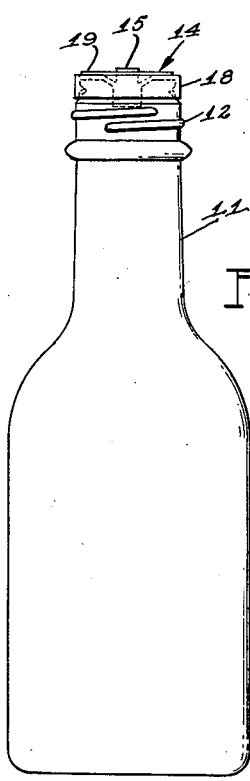
FIG-1-
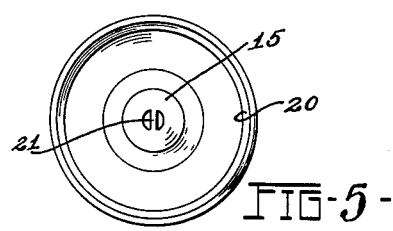
FIG-5-
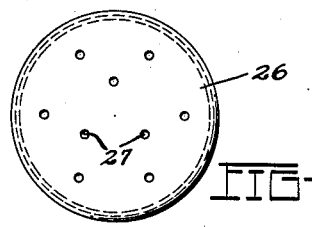
FIG-6-
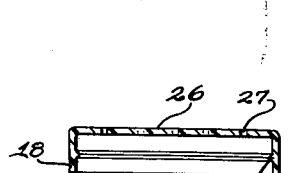
FIG-7-
Inventor:
JACK M. WHEATON.
By Rule & Hoge
Attorneys Patented Mar. 10, 1953

2,630,944

UNITED STATES PATENT OFFICE 2,630,944

DISPENSING PACKAGE FOR LIQUIDS

Jack M. Wheaton, Toledo, Ohio, assignor to Owens-Illinois Glass Company, a corporation of Ohio Application April 12, 1950, Serial No. 155,403

11 Claims. (Cl. 222—108)

This invention relates to bottles and closures with restricted openings for dispensing liquids such as meat sauce, hair tonics, and the like.

Heretofore, bottles for such purposes have been formed with restricted openings and sealed with removable caps. Such a construction has resulted in several undesirable effects. First, the rate of filling the containers is very low due to the small size of the opening. Second, in dispensing the liquid it often wets the outer surface of the container, and runs down the sides of the container disfiguring the label and producing an unsightly package. Third, when the opening is made small enough to dispense only a few drops at a time, the liquid has the tendency to surge from the container resulting in a spray of drops some distance from the objective. My invention is intended to overcome these objectionable effects.

An object of my invention is to provide a container having an unrestricted neck opening and provided with a removable cap or closure and a novel form of dispensing fitment which is retained on the container when the cap is removed thereby permitting the contents of the container to be dispensed.

Another object of the invention is to provide a dispensing fitment which can be easily applied to the unrestricted opening of a container after the container has been filled.

Another object of my invention is to provide a combination of a container having an unrestricted opening, a removable cap and a dispensing fitment wherein the dispensing fitment also serves as a sealing liner.

Another object of the invention is to provide a combination of a container having an unrestricted opening, a removable cap and a dispensing fitment wherein the dispensing fitment is provided with a draining surface which prevents and retards the flow of liquid over the sides of the container.

Another object of my invention is to provide a dispensing fitment wherein the dispensing opening is provided with a baffling means to prevent the surge of liquid when the contents of the container is being dispensed.

Other objects of the invention will appear hereinafter.

Basically, my invention comprises a container having an unrestricted opening, a dispensing fitment made of thin resilient material, and a removable cap adapted to fit over the neck of the container. The fitment is positioned on the neck of the container and includes a dispensing opening at its center and an annularly spaced well.

Referring to the accompanying drawings:

Fig. 1 is an elevational view of the container and the dispensing fitment;

Fig. 2 is a fragmentary sectional view of the container with the dispensing fitment and the cap in sealing position;

Fig. 3 is a plan view of the dispensing fitment;

Fig. 4 is a sectional view at the line 4—4 on on Fig. 3;

Fig. 5 is a bottom plan view of the dispensing fitment;

Fig. 6 is a plan view of a modified form of the dispensing fitment;

Fig. 7 is a sectional elevational view of the modified form shown in Fig. 6.

Referring to Fig. 1, the container 10 is formed with a neck 11. The outer surface of the neck is molded to form a spiral thread 12, an annular groove or recess 28, and an annular bead 13 adjacent the upper surface of the neck (Fig. 2).

As shown in Fig. 4, the dispensing fitment 14 comprises a nozzle 15, an inclined portion 16 surrounding said nozzle 15 and extending outwardly and upwardly from said nozzle, a horizontal rim 17 and a downwardly projecting skirt 18. The nozzle 15 is in the form of a short cylinder having a restricted vertical opening 15ª therethrough. An annular ridge 19 is formed on the upper surface of the horizontal rim 17 in such a position that it will be directly over the upper surface of the neck when the fitment is placed on the container (Fig. 2). The inner surface of the skirt 18 is formed with a circumferential bead 20 (Fig. 4). The upper portion of the nozzle 15 projects upwardly above the plane of the upper surface of the ridge 19. A transverse or radial segment 21 extends across the lower part of the opening 15ª of the nozzle 15 and serves as a baffling means as described below. As shown in Fig. 1, the outer diameter of the dispensing fitment 14 is substantially equal to the outer diameter of the neck 11.

The dispensing fitment is formed in one piece and is made of a flexible and resilient material which is impervious to the action of mold or bacteria and imparts no characteristic odor or taste to products with which it may come in contact. I have found that polyethylene is particularly adapted for this purpose.

As shown in Fig. 2, the cap comprises a cylindrical top 22 and a marginal skirt 23 formed with a thread 24 adapted to fit the thread 12 on the container neck.

After the container has been filled, the dispensing fitment is placed as shown in Fig. 1, the circumferential bead 20 snapping over the annular bead 13 of the container and into the groove 28 thereby forming a seal between the upper surface of the container and the fitment. The cap is then screwed on the container, and as shown in Fig. 2, makes sealing contact with the ridge 19 and the upper surface of the nozzle 15. Since the ridge 19 overlies the upper surface of the neck, the pressure of the cap on the ridge 19 also increases the sealing pressure between the under surface of the rim 17 and the upper surface of the neck. Since the upper surface of the nozzle projects above the plane of the upper surface of the ridge 19, the cap presses against the upper surface of the nozzle and flexes the fitment causing the thin inclined portions 16 and the inner part of the thin horizontal rim 17 to assume the position shown in Fig. 2. It is thus apparent that no leakage is possible under the rim 17 or out of the opening 15ª even though no sealing liner is used in the cap.

When it is desired to dispense a portion of the contents, the cap is removed and the bottle is inverted. The transverse segment 21 constricts the lower end of the outlet opening 15ª and acts as a baffle and thereby prevents the surge of liquid from the opening, so that no spraying or splattering occurs. Any liquid which may remain on the upper part of the fitment will, when the bottle is returned to its vertical position, drain into the well formed by the inclined portions 16 and the nozzle 15.

A modified form of the invention is shown in Figs. 6 and 7, and also utilizes the idea, shown in the previous form, of using a dispensing fitment which remains attached to the container when the cap is removed. In this form, the dispensing fitment comprises a circular top 26 which is formed with perforations 27. The fitment is formed with the skirt and bead in the same manner as the other form of my invention. This form is especially adapted to dispensing condiments.

Modifications may be resorted to within the spirit and scope of my invention.

I claim:

1. A dispensing fitment consisting of thin resilient material comprising a cylindrical wall forming a dispensing opening, a diametral segment extending across the lower part of the opening, an inclined portion surrounding said cylindrical wall and extending outwardly and upwardly from a point below the top of the cylindrical wall which comprises the nozzle, a horizontal rim at the outer edge of said inclined portion and a downwardly projecting skirt at the perimeter of said rim, means forming a part of said skirt for making sealing contact with a container neck.

2. The combination of a container having a neck, the outer surface of said neck being formed with a spiral thread, an annular bead adjacent to the upper surface of the neck, and an annular recess below said bead, a dispensing fitment consisting of thin resilient material and seated on said neck, said fitment comprising a nozzle in the form of a vertical cylindrical wall, an intermediate portion surrounding said nozzle and forming an annular well around the nozzle, a horizontal rim at the outer edge of said intermediate portion and a downwardly projecting skirt at the perimeter of said rim, the inner surface of said skirt being formed with a circumferential bead positioned and adapted to snap over the annular bead on the container neck and into the annular recess below said bead and thus lock the upper surface of the container neck in sealing contact with the under surface of the horizontal rim of the dispensing fitment, and a cap adapted to fit over the neck of the container, said cap comprising a circular portion and a depending marginal skirt, the inner surface of said marginal skirt being formed with a thread adapted to cooperate with the thread on the container neck for attachment of the cap to the container, said cap having such a configuration as to make sealing contact with the horizontal rim and the upper surface of the nozzle of the dispensing fitment.

3. The combination defined in claim 2, said horizontal rim having an annular ridge formed on its upper surface, said annular ridge being so positioned that it is directly above the upper surface of the container when the fitment is fitted to the container, the under surface of the circular portion of the cap being horizontal and said ridge comprising the portion of the horizontal rim with which the cap makes sealing contact.

4. The combination of a container having a neck, the outer surface of said neck being formed with a spiral thread, an annular bead adjacent to the upper surface of the neck, and an annular recess below said bead, a dispensing fitment consisting of thin resilient material and seated on said neck, said fitment comprising a nozzle in the form of a vertical cylindrical wall, an inclined portion surrounding said nozzle and extending outwardly and upwardly from a point below the top of the vertical cylindrical wall which comprises said nozzle, a horizontal rim at the outer edge of said inclined portion and a downwardly projecting skirt at the perimeter of said rim, the inner surface of said skirt being formed with a circumferential bead adapted to snap over the annular bead on the container neck and into the annular recess below said bead, the said beads being relatively positioned to hold and lock the under surface of the horizontal rim of the dispensing fitment in sealing contact with the upper surface of the container neck, and a cap adapted to fit over the neck of the container, said cap comprising a circular portion and a depending marginal skirt, the inner surface of said marginal skirt being formed with a thread adapted to cooperate with the thread on the container neck for attachment of the cap to the container, the upper surface of the vertical cylindrical wall which comprises the nozzle projecting upwardly above the plane of the horizontal rim, said cap having such a configuration as to make sealing contact with the horizontal rim and the upper surface of the nozzle of the dispensing fitment.

5. A dispensing fitment consisting of thin resilient material comprising a cylindrical wall forming a dispensing nozzle, an intermediate portion surrounding said nozzle and forming an annular well around said nozzle, a horizontal rim at the outer edge of said intermediate portion and a downwardly projecting skirt at the perimeter of said rim, and means forming a part of said skirt for making sealing contact with a container neck.

6. A dispensing fitment consisting of thin resilient material comprising a cylindrical wall forming a dispensing nozzle, a diametral segment extending across the lower part of the opening, an inclined portion surrounding said cylindrical wall and extending outwardly and upwardly from a point below the top of the cylindrical wall which comprises the nozzle, a horizontal rim at the outer edge of inclined portion, a downwardly projecting skirt at the perimeter of said rim, a circumferential bead on the inner surface of said skirt, and an annular ridge formed on the upper surface of the horizontal rim, the upper surface of the cylindrical wall projecting upwardly above the plane of the annular ridge.

7. The combination of a container having a neck, the outer surface of said neck being formed with a spiral thread, an annular bead adjacent to the upper surface of the neck, and an annular recess below said bead, a dispensing fitment consisting of thin resilient material and sealed on said neck, said fitment comprising a nozzle in the form of a vertical cylindrical wall, an inclined portion surrounding said nozzle and extending outwardly and upwardly from a point below the top of the vertical cylindrical wall which comprises said nozzle, a horizontal rim at the outer edge of said inclined portion and a downwardly projecting skirt at the perimeter of said rim, the inner surface of said skirt being formed with a circumferential bead adapted to snap over the annular bead on the container neck and into the annular recess below said bead, the said beads being relatively positioned to hold and lock the under surface of the horizontal rim of the dispensing fitment in sealing contact with the upper surface of the container neck, and a cap adapted to fit over the neck of the container, said cap comprising a circular portion and a depending marginal skirt, the inner surface of said marginal skirt being formed with a thread adapted to cooperate with the thread on the container neck, for attachment of the cap to the container, the upper surface of the cylindrical wall which comprises the nozzle projecting upwardly above the plane of the horizontal rim, said horizontal rim having an annular ridge formed on its upper surface, said annular ridge being so positioned that it is directly above the upper surface of the container when the fitment is fitted to the container, the under surface of the circular portion of the cap being horizontal, said cap making sealing contact with the ridge on said horizontal rim and the upper surface of the nozzle of the dispensing fitment.

8. The combination of a container having a neck, the outer surface of said neck being formed with a spiral thread, an annular bead adjacent to the upper surface of the neck, and an annular recess below said bead, a dispensing fitment consisting of thin resilient material and seated on said neck, said fitment comprising a nozzle in the form of a vertical cylindrical wall, a diametral segment extending across the lower part of the opening of the nozzle, an inclined portion surrounding said nozzle and extending outwardly and upwardly from a point below the top of the vertical cylindrical wall which comprises said nozzle, a horizontal rim at the outer edge of said inclined portion and a downwardly projecting skirt at the perimeter of said rim, the inner surface of said skirt being formed with a circumferential bead adapted to snap over the annular bead on the container neck and into the annular recess below said bead, the said beads being relatively positioned to hold and lock the under surface of the horizontal rim of the dispensing fitment in sealing contact with the upper surface of the container neck, and a cap adapted to fit over the neck of the container, said cap comprising a circular portion and a depending marginal skirt, the inner surface of said marginal skirt being formed with a thread adapted to cooperate with the thread on the container neck for attachment of the cap to the container, the upper surface of the cylindrical wall which comprises the nozzle projecting upwardly above the plane of the horizontal rim, said horizontal rim having an annular ridge formed on its upper surface, said annular ridge being so positioned that it is directly above the upper surface of the container when the fitment is fitted to the container, the under surface of the circular portion of the cap being horizontal, said cap making sealing contact with the ridge on said horizontal rim and the upper surface of the nozzle of the dispensing fitment.

9. A dispensing fitment consisting of thin resilient material comprising a cylindrical wall forming a dispensing opening, a diametral segment extending across the lower part of the opening, an intermediate portion surrounding said nozzle, a horizontal rim at the outer edge of said intermediate portion and a downwardly projecting skirt at the perimeter of said rim, means forming a part of said skirt for making sealing contact with a container neck.

10. The combination set forth in claim 2 including a diametral segment extending across the lower part of the opening in the nozzle.

11. The combination set forth in claim 10, said horizontal rim having an annular ridge formed on its upper surface, said annular ridge being so positioned that it is directly above the upper surface of the container when the fitment is fitted to the container, the under surface of the circular portion of the cap being horizontal and said ridge comprising the portion of the horizontal rim with which the cap makes sealing contact.

JACK M. WHEATON.

REFERENCES CITED

The following references are of record in the file of this patent:

UNITED STATES PATENTS

| Number | Name | Date |
|---|---|---|
| 1,255,779 | Oesch | Feb. 5, 1918 |
| 1,279,487 | Wardell | Sept. 17, 1918 |
| 1,977,414 | Testa | Oct. 16, 1934 |
| 2,107,167 | Sierad | Feb. 1, 1938 |
| 2,209,062 | Lusher | July 23, 1940 |
| 2,342,932 | Fram et al. | Feb. 29, 1944 |
| 2,547,590 | McGinnis | Apr. 3, 1951 |